United States Patent
Takahashi

(10) Patent No.: US 9,635,590 B2
(45) Date of Patent: Apr. 25, 2017

(54) MOBILE STATION AND MOBILE COMMUNICATION METHOD

(71) Applicant: NTT DOCOMO, INC., Tokyo (JP)

(72) Inventor: Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 8 days.

(21) Appl. No.: 14/391,276

(22) PCT Filed: Apr. 16, 2013

(86) PCT No.: PCT/JP2013/061261
§ 371 (c)(1),
(2) Date: Oct. 8, 2014

(87) PCT Pub. No.: WO2013/157537
PCT Pub. Date: Oct. 24, 2013

(65) Prior Publication Data
US 2015/0117405 A1  Apr. 30, 2015

(30) Foreign Application Priority Data

Apr. 16, 2012 (JP) ................................ 2012-093009

(51) Int. Cl.
H04W 4/00 (2009.01)
H04W 36/00 (2009.01)
H04L 5/00 (2006.01)

(52) U.S. Cl.
CPC ......... *H04W 36/0016* (2013.01); *H04L 5/001* (2013.01); *H04L 5/0098* (2013.01); *H04W 36/0055* (2013.01); *H04L 5/00* (2013.01)

(58) Field of Classification Search
CPC ......... H04W 36/0005; H04W 36/0011; H04W 36/0016; H04W 36/0055; H04W 36/0061; H04W 36/0083; H04W 36/0088; H04W 36/0094; H04L 5/00
See application file for complete search history.

(56) References Cited

U.S. PATENT DOCUMENTS

2010/0103875 A1* 4/2010 Simonsson ......... H04W 76/022
370/328
2011/0230208 A1* 9/2011 Kangas ................. G01S 5/0226
455/456.1

(Continued)

FOREIGN PATENT DOCUMENTS

JP  2012-5084 A  1/2012

OTHER PUBLICATIONS

International Search Report for corresponding International Application No. PCT/JP2013/061261, mailed May 21, 2013 (1 page).
Written Opinion for corresponding International Application No. PCT/JP2013/061261, mailed May 21, 2013 (3 pages).

(Continued)

*Primary Examiner* — Kevin Mew
(74) *Attorney, Agent, or Firm* — Osha Liang LLP

(57) ABSTRACT

A mobile station (UE) of the invention includes: a reception unit (11) configured, when CA communication is performed by using a cell (#A) as a Pcell and using a cell (#1) as an Scell, to receive "mobilityControlInformation" instructing switching of the Pcell to a macrocell (#B); and a management unit (12) configured, when the "mobilityControlInformation" further instructs setting of the cell (#1) as the Scell, to set the cell (#1) as the Scell in an activated state.

3 Claims, 8 Drawing Sheets

(56) References Cited

U.S. PATENT DOCUMENTS

| | | | | |
|---|---|---|---|---|
| 2012/0003943 | A1* | 1/2012 | Marinier | H04W 36/0083 455/73 |
| 2012/0100860 | A1* | 4/2012 | Lei | H04W 36/20 455/438 |
| 2012/0163338 | A1* | 6/2012 | Zhang | H04W 36/0083 370/331 |
| 2012/0281593 | A1* | 11/2012 | Stewart | H04W 16/14 370/259 |
| 2013/0022026 | A1* | 1/2013 | Ishii | H04L 5/001 370/332 |
| 2013/0034006 | A1* | 2/2013 | Ishii | H04W 24/10 370/252 |
| 2013/0203419 | A1* | 8/2013 | Siomina | H04W 36/18 455/437 |
| 2013/0250911 | A1* | 9/2013 | Kwon | H04W 56/00 370/331 |
| 2013/0310037 | A1* | 11/2013 | Ji | H04W 36/0083 455/436 |
| 2013/0343345 | A1* | 12/2013 | Dinan | H04W 36/30 370/332 |
| 2015/0146692 | A1* | 5/2015 | Yi | H04W 36/0055 370/331 |
| 2015/0230142 | A1* | 8/2015 | Yang | H04W 36/00 370/331 |
| 2015/0264621 | A1* | 9/2015 | Sivanesan | H04W 36/0055 455/436 |
| 2015/0296426 | A1* | 10/2015 | Mildh | H04W 36/0055 455/436 |

OTHER PUBLICATIONS

3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Sep. 2012 (205 pages).

3GPP TS 36.331 V11.1.0; "3rd Generation Partnership Project; Technical Specification Group Radio Access Network; Evolved Universal Terrestrial Radio Access (E-UTRA); Radio Resource Control (RRC); Protocol specification (Relelase 11);" Sep. 2012 (325 pages).

Alcatel-Lucent, Alcatel-Lucent Shanghai Bell; "Handover procedure in CA;" TSG-RAN WG2#70, R2-103155; Montreal, Canada; May 11-15, 2010 (4 pages).

Samsung; "Handover with CA- stage 2 level issues"; 3GPP TSG-RAN2#70 meeting, Tdoc R2-103113; Montreal, Canada; May 10-14, 2010 (7 pages).

Nokia Corporation et al.; "SCC reconfiguration and relation to Activation of SCC"; 3GPP TSG-RAN WG2 Meeting #70, R2-102883; Montreal, Canada; May 10-14, 2010 (4 pages).

LG Electronics Inc.; "SCell handling at handover"; 3GPP TSG-RAN2 Meeting #72, R2-106575; Jacksonville, USA; Nov. 15-19, 2010 (3 pages).

Potevio; "Miscellaneous corrections to TS 36.300 on Carrier Aggregation"; 3GPP TSG-RAN WG2 Meeting #73, R2-110976; Taipei; Feb. 21-25, 2011 (9 pages).

Search Report issued in corresponding European Application No. 13779042.4, mailed Feb. 2, 2016 (9 pages).

* cited by examiner

MOBILE STATION AND MOBILE COMMUNICATION METHOD

TECHNICAL FIELD

The present invention relates to a mobile station and a mobile communication method.

BACKGROUND ART

As shown in FIG. 6, in a mobile communication system supporting the LTE (Long Term Evolution)-Advanced, a mobile station UE can perform CA (Carrier Aggregation) communication by using a macrocell #1 as a Pcell which is a serving cell in a PCC (Primary Component Carrier, a main carrier), and using a picocell #1 as an Scell which is a serving cell in an SCC (Secondary Component Carrier, a sub-carrier), under control of a radio base station eNB#1.

Here, when handover procedures are performed for switching the Pcell of the mobile station UE from the macrocell #1 under control of the radio base station eNB#1 to a macrocell #2 under control of a radio base station eNB#2, the mobile station UE deletes the picocell #1 previously set as the Scell under control of the radio base station eNB#1.

Specifically, as shown in step 7 in FIG. 7, the mobile station UE deletes the picocell #1 previously set as the Scell under control of the radio base station eNB#1 in accordance with "mobilityControlInformation" included in "RRC Connection Reconfiguration."

Meanwhile, when the mobile station UE is instructed to set the picocell #1 as the Scell under control of the radio base station eNB#2 by the "mobilityControlInformation" included in the "RRC Connection Reconfiguration," the mobile station UE sets the picocell #1 in a deactivated state under control of the radio base station eNB#2.

In the meantime, as shown in FIG. 8, in the mobile communication system supporting the LTE-Advanced, when the picocell #1 is deployed near a boundary between the macrocell #1 and the macrocell #2 under control of the radio base station eNB#1, the picocell #1 can be continuously used as the Scell after the handover procedures are performed for switching the Pcell of the mobile station UE from the macrocell #1 to the macrocell #2.

PRIOR ART DOCUMENT

Non-Patent Document

Non-patent document 1: 3GPP TS36.300

SUMMARY OF THE INVENTION

However, in the conventional mobile communication system supporting the LTE-Advanced, even when the picocell #1 is deployed near the boundary between the macrocell #1 and the macrocell #2 provided by the same radio base station eNB#1 as shown in FIG. 8, the Scell (the picocell #1) is set in the deactivated state while the handover procedures are being performed for switching the Pcell of the mobile station UE from the macrocell #1 to the macrocell #2. Hence, there is a problem that the mobile station UE cannot receive downlink data addressed to the mobile station UE via the Scell (the picocell #1).

The present invention has been made in view of the aforementioned problem. An objective of the present invention is to provide a mobile station and a mobile communication method, which are capable of receiving downlink data via an Scell in the course of handover procedures for switching a Pcell to be performed during CA communication.

A first feature of the present invention is summarized as a mobile station including: a reception unit configured, when CA communication is performed by using a first cell as a primary cell and using a second cell as a secondary cell, to receive a handover instruction signal instructing switching of the primary cell to a third cell; and a management unit configured, when the handover instruction signal further instructs setting of the second cell as the secondary cell, to set the second cell as the secondary cell in an activated state.

A second feature of the present invention is summarized as a mobile communication method including the steps of: receiving, by a mobile station which performs CA communication by using a first cell under control of a first radio base station as a primary cell and using a second cell under control of the first radio base station as a secondary cell, a handover instruction signal instructing switching of the primary cell to a third cell under control of a second radio base station; setting, by the mobile station, the second cell as the secondary cell in an activated state when the handover instruction signal further instructs setting of the second cell as the secondary cell; forwarding, by the first radio base station, downlink data addressed to the mobile station from the first radio base station to the second radio base station; transmitting, by the first radio base station, a forwarding completion notification signal to the second radio base station when forwarding of the downlink data addressed to the mobile station is completed; and instructing, by the second radio base station, the mobile station to delete the second cell set as the secondary cell when the second radio base station receives the forwarding completion notification signal.

DETAILED DESCRIPTION

Mobile Communication System According to First Embodiment of Present Invention

A mobile communication system according to a first embodiment of the present invention will be described with reference to FIG. 1 to FIG. 5.

Figure 1:
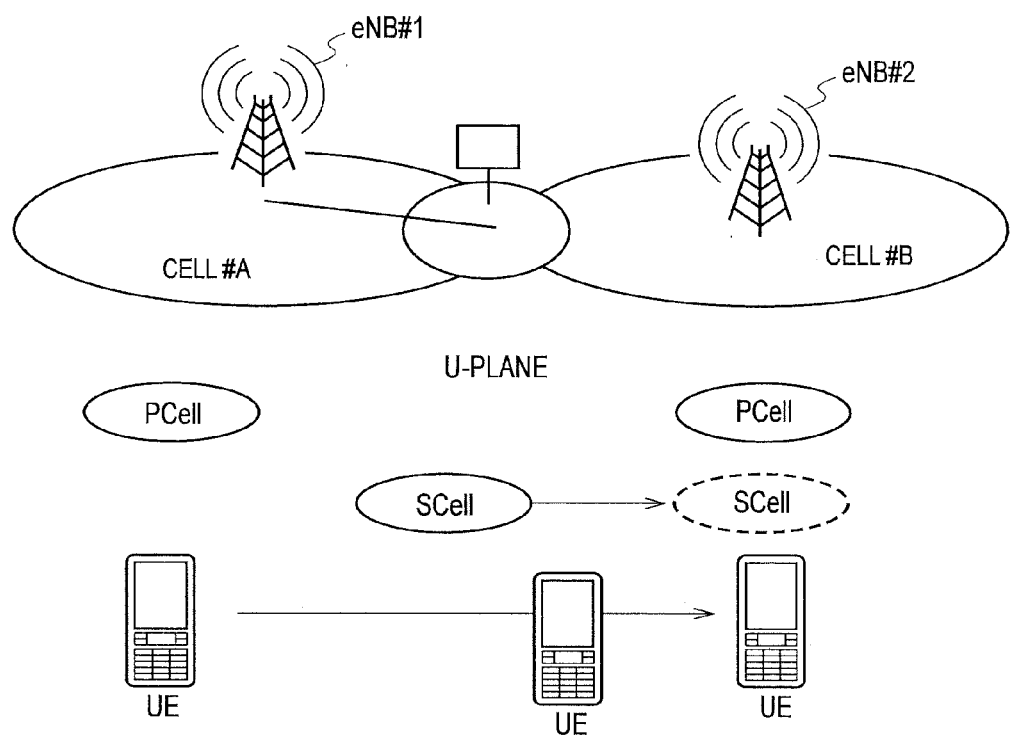
FIG. 1 is an overall configuration diagram of a mobile communication system according to a first embodiment of the present invention.

As shown in FIG. 1, a mobile communication system of the embodiment supports the LTE-Advanced and is capable of performing CA.

As shown in FIG. 1, a cell #A, a cell #B, and a cell #1 are deployed in the mobile communication system of the embodiment. Here, the cell #1 is deployed near a boundary between the cell #A and the cell #B.

It is to be noted that the cell #A and the cell #B may be managed by the same radio base station (such as a radio base station eNB#1) or by different radio base stations (such as radio base stations eNB#1 and eNB#2).

Meanwhile, the cell #1 may be managed by the radio base station eNB#1 or managed by the radio base stations eNB#1 and eNB#2.

In the embodiment, the cell #A and the cell #B are assumed to be managed by the same radio base station eNB#1 while the cell #1 is assumed to be managed by the radio base station eNB#1.

Here, each of the cell #A and the cell #B is a cell (such as a macrocell) operated by a frequency carrier in a coverage band that supports a wide area.

On the other hand, the cell #1 is a cell (such as a picocell) which is deployed in cover areas of the cell #A and of the cell #B and is operated by a frequency carrier in a capacity band for improving throughput at a hot spot.

Meanwhile, as shown in FIG. 1, the embodiment assumes a case in which a mobile station UE performs handover procedures for transitioning from a state where the cell #A is set as a Pcell while the cell #1 is set as an Scell to a state where the cell #B is set as the Pcell while the cell #1 is set as the Scell.

Figure 2:
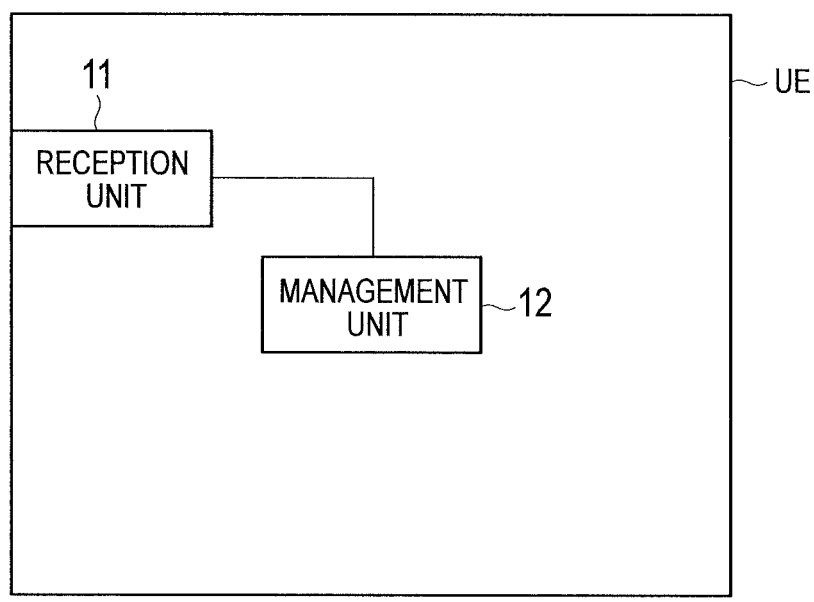
FIG. 2 is a functional block diagram of a mobile station according to the first embodiment of the present invention.

The mobile station UE is compatible with the LTE-Advanced, and includes a reception unit 11 and a management unit 12 as shown in FIG. 2.

The reception unit 11 is configured to receive various signals transmitted by the radio base stations eNB.

When the mobile station UE is performing the CA communication, for example, the reception unit 11 is configured to receive "RRC Connection Reconfiguration" including "mobilityControlInformation (a handover instruction signal)" that instructs switching of the Pcell.

The management unit 12 is configured to manage the Pcell and the Scell used in the CA communication.

When the mobile station UE is performing the CA communication by using the cell #A as the Pcell and using the cell #1 as the Scell and when the "mobilityControlInformation" received by the reception unit 11 instructs switching of the Pcell to the cell #B and setting of the picocell #1 as the Scell, for example, the management unit 12 is configured to set the picocell #1 as the Scell in an activated state.

As a result, the radio base station eNB#2 can transmit downlink data (U-plane data) addressed to the mobile station UE via the Scell (the picocell #1) even when the above-described handover procedures are being performed for switching the Pcell of the mobile station UE.

An operation of the mobile station UE of the embodiment will be described below with reference to FIG. 3.

Figure 3:
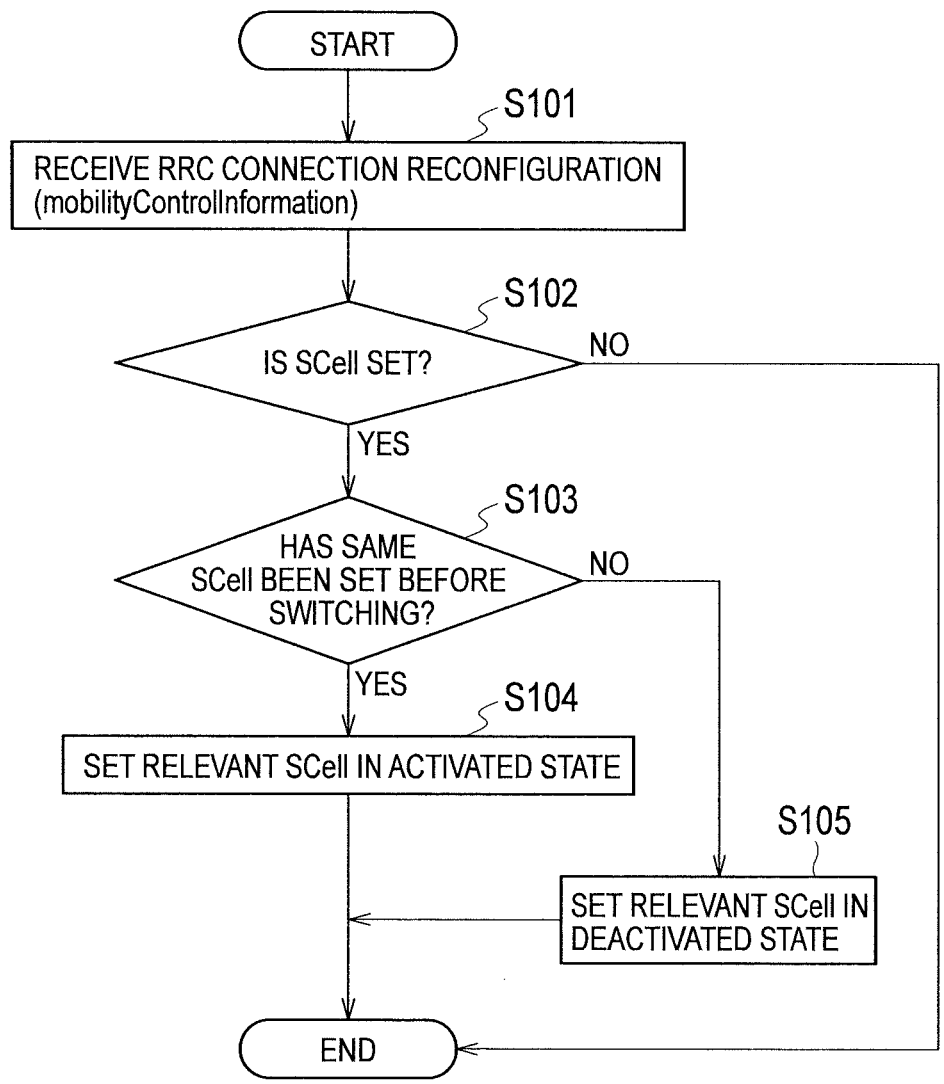
FIG. 3 is a diagram for explaining an operation of the mobile station according to the first embodiment of the present invention.

As shown in FIG. 3, while the mobile station UE is performing the CA communication, if the "RRC Connection Reconfiguration" including the "mobilityControlInformation" that instructs switching of the Pcell of the mobile station UE is received in step S101, the mobile station UE judges in step S102 whether or not the "mobilityControlInformation" instructs setting of the Scell.

In the case of YES, the operation proceeds to step S103. In the case of NO, the operation is terminated after processing for switching the Pcell is performed.

In step S103, prior to switching the Pcell, the mobile station UE judges whether or not the Scell instructed in the "mobilityControlInformation" has been set.

In the case of YES, the operation proceeds to step S104. In the case of NO, the operation proceeds to step S105.

In step S104, the mobile station UE performs the processing for switching the Pcell, and sets the Scell, which is instructed to be set in the above-mentioned "mobilityControlInformation," in the activated state.

On the other hand, in step S105, the mobile station UE performs the processing for switching the Pcell, and sets the Scell, which is instructed to be set in the above-mentioned "mobilityControlInformation," in a deactivated state.

According to the invention of the embodiment, when the "mobilityControlInformation" received in the handover procedures for switching the Pcell of the mobile station UE instructs setting of the cell as the Scell, which is the same cell as the one having been set as the Scell prior to switching the Pcell, the mobile station UE performing the CA communication is configured to set the relevant Scell in the activated state. Thus, it is possible to receive the downlink data addressed to the mobile station UE via the Scell in the course of the handover procedures.

Mobile Communication System According to Second Embodiment of Present Invention

A mobile communication system according to a second embodiment of the present invention will be described with reference to FIG. 4 and FIG. 5. The mobile communication system according to the second embodiment of the present invention will be described below while focusing on differences from the above-described mobile communication system according to the first embodiment.

In the embodiment, the cell #A is assumed to be managed by the radio base station eNB#1, the cell #B is assumed to be managed by the radio base station eNB#2, and the cell #1 is assumed to be managed by the radio base stations eNB#1 and eNB#2.

Meanwhile, as shown in FIG. 1, the embodiment assumes the case in which the mobile station UE performs the handover procedures for transitioning from the state where the cell #A is set as the Pcell while the cell #1 is set as the Scell to the state where the cell #B is set as the Pcell while the cell #1 is set as the Scell.

Here, the configuration of the radio base station eNB#1 is basically the same as the configuration of the radio base station eNB#2. Accordingly, the configuration of the radio base station eNB#2 will be representatively described below.

Figure 4:
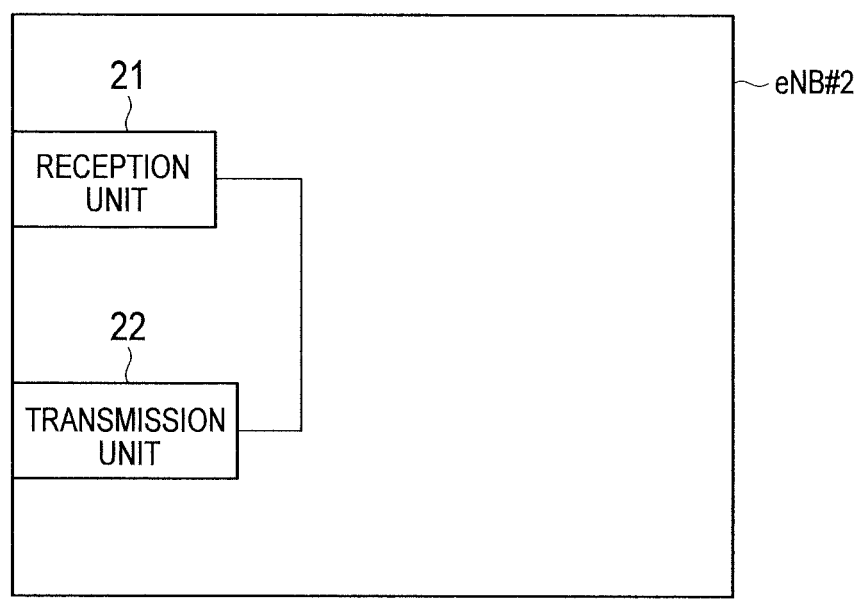
FIG. 4 is a functional block diagram of a radio base station according to a second embodiment of the present invention.

As shown in FIG. 4, the radio base station eNB#2 includes a reception unit 21 and a transmission unit 22.

The reception unit 21 is configured to receive various signals transmitted by the mobile station UE and the radio base station eNB#1. The transmission unit 22 is configured to transmit various signals to the mobile station UE and the radio base station eNB#1.

For example, in the above-described handover procedures, the reception unit 21 is configured to receive the downlink data addressed to the mobile station UE and forwarded by the radio base station eNB#1.

Figure 5:
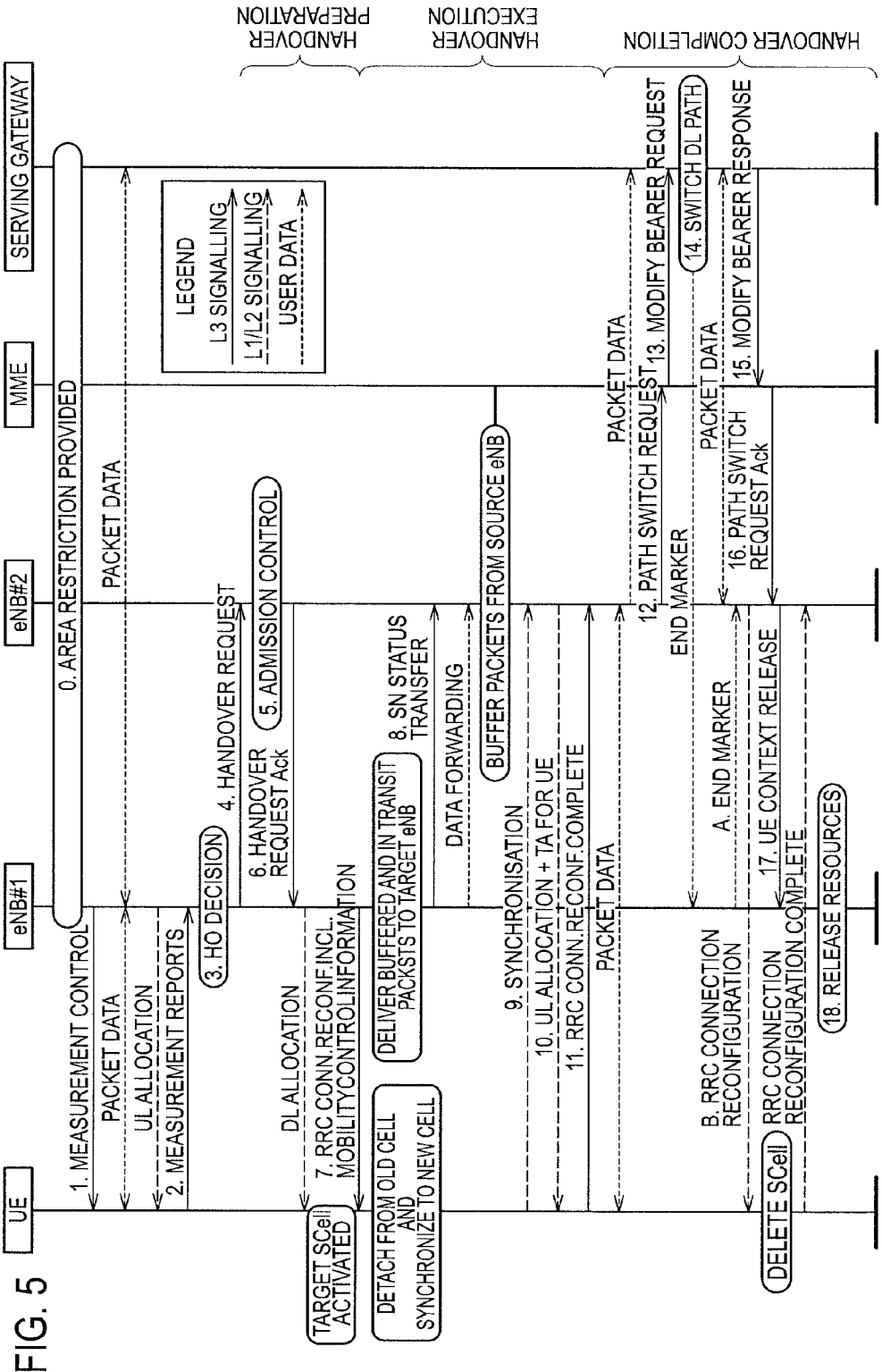
FIG. 5 is a sequence diagram showing an operation of a mobile communication system according to the second embodiment of the present invention.
Figure 6:
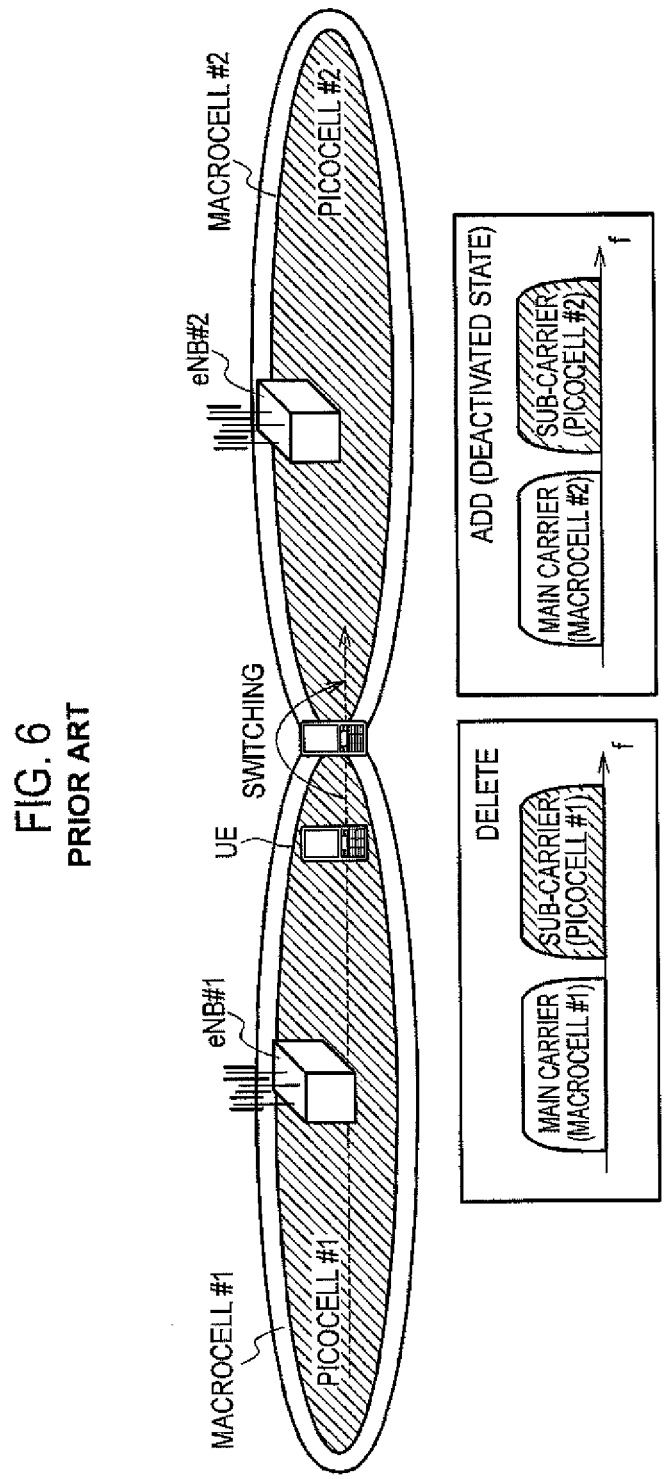
FIG. 6 is a diagram for explaining a conventional mobile communication system.
Figure 7:
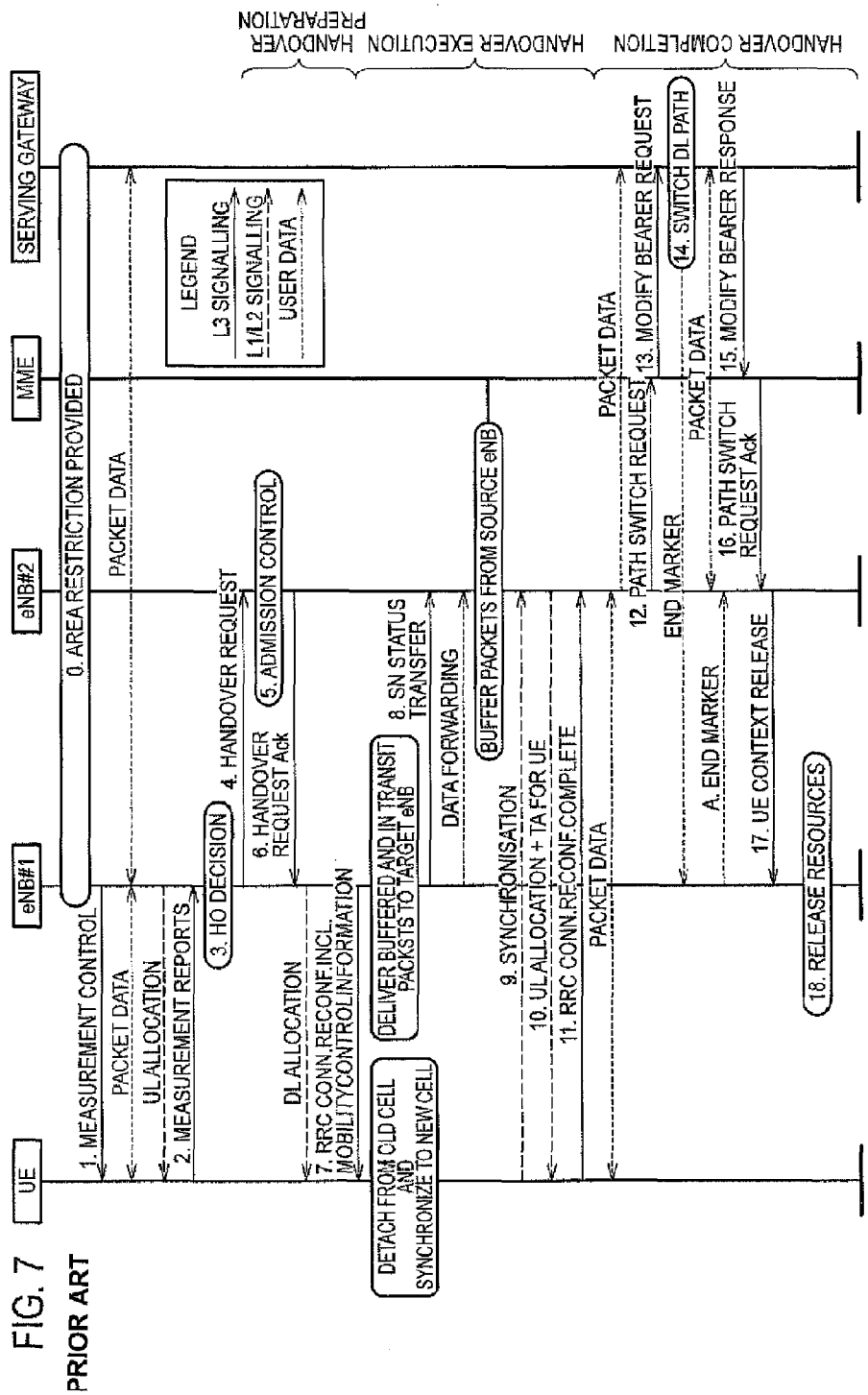
FIG. 7 is a diagram for explaining the conventional mobile communication system.
Figure 8:
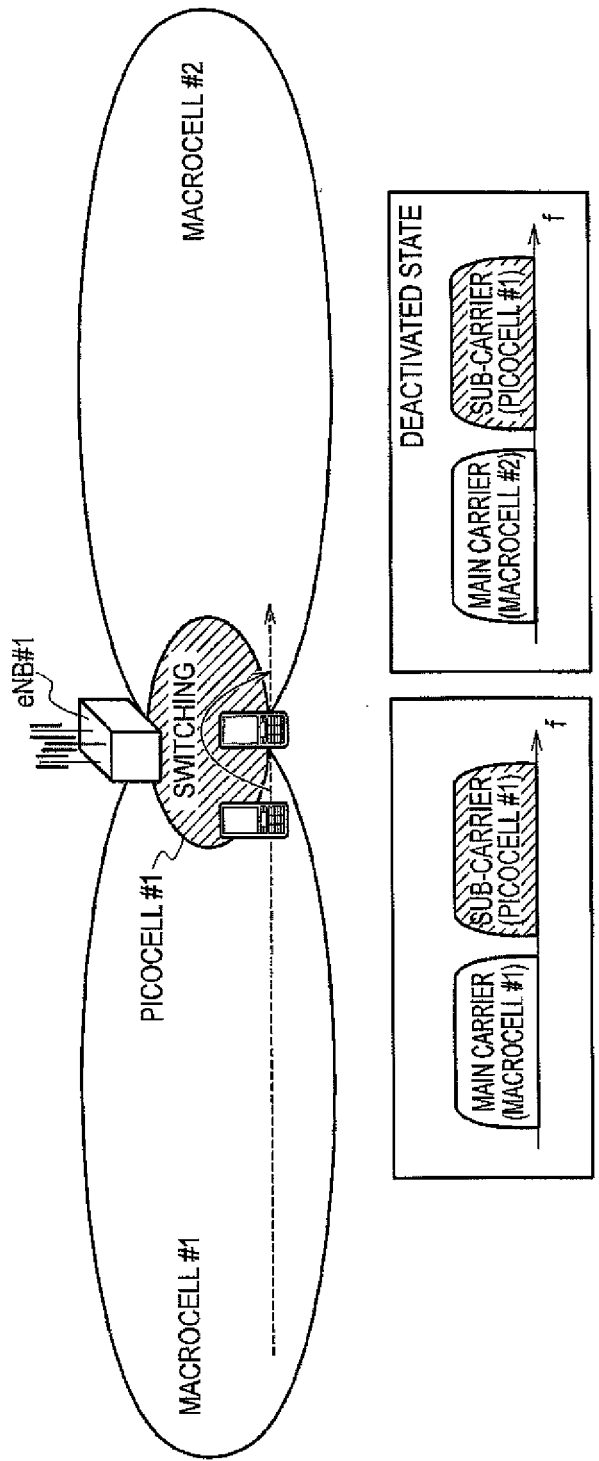
FIG. 8 is a diagram for explaining the conventional mobile communication system.

In the meantime, as shown in FIG. 5, when the reception unit 21 receives "End Marker (a forwarding completion notification signal)" indicating completion of forwarding of the downlink data addressed to the mobile station UE by the radio base station eNB#1 (step A), the transmission unit 22 is configured to send to the mobile station UE "RRC Connection Reconfiguration" which instructs deletion of the cell #1 that is set as the Scell (step B).

The features of the above-described embodiment may also be expressed as follows.

A first feature of this embodiment is summarized as a mobile station UE including: a reception unit 11 configured, when CA communication is performed by using a cell #A (a first cell) as a Pcell (a primary cell) and using a cell #1 (a second cell) as a Scell (a secondary cell), to receive "mobilityControlInformation (a handover instruction signal)" instructing switching of the Pcell to a cell #B (a third cell); and a management unit 12 configured, when the "mobilityControlInformation" further instructs setting of the cell #1 as the Scell, to set the cell #1 as the Scell in an activated state.

In the first feature of this embodiment, the cell #A, the cell #1, and the cell #B are under control of a single radio base station eNB.

In the first feature of this embodiment, the cell #A is a cell under control of a radio base station eNB#1 (a first radio base station), the cell #B is a cell under control of a radio base station eNB#2 (a second radio base station), and the cell #1 is a cell under control of the radio base station eNB#1 and is also a cell under control of the radio base station eNB#2.

A second feature of this embodiment is summarized as a mobile communication method including the steps of: causing a mobile station UE, when CA communication is performed by using a cell #A under control of a radio base station eNB#1 as a Pcell and using a cell #1 under control of the radio base station eNB#1 as a Scell, to receive a "mobilityControlInformation" instructing switching of the Pcell to a cell #B under control of a radio base station eNB#2; causing the mobile station UE, when the "mobilityControlInformation" further instructs setting of the cell #1 as the Scell, to set the cell #1 as the Scell in an activated state; causing the radio base station eNB#1 to forward downlink data addressed to the mobile station UE from the radio base station eNB#1 to the radio base station eNB#2; causing the radio base station eNB#1 to transmit an "End Marker (a forwarding completion notification signal)" to the radio base station eNB#2 when forwarding of the downlink data addressed to the mobile station UE is completed; and causing the radio base station eNB#2 to instruct the mobile station UE to delete the cell #1 set as the Scell when the radio base station eNB#2 receives the "End Marker".

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-093009 (filed on Apr. 16, 2012) is incorporated by reference in the present specification.

INDUSTRIAL APPLICABILITY

As described above, according to the present invention, it is possible to provide a mobile station and a mobile communication method, which are capable of receiving downlink data via an Scell in the course of handover procedures for switching a Pcell to be performed during CA communication.

EXPLANATION OF THE REFERENCE NUMERALS eNB radio base station
UE mobile station
11, 21 reception unit
12 management unit
22 transmission unit

The invention claimed is:
1. A mobile station comprising:
a receiver configured, when CA (Carrier Aggregation) communication is performed by using a first cell as a primary cell and using a second cell as a secondary cell, to receive a handover instruction signal instructing switching of the primary cell to a third cell; and
a processor configured, when the handover instruction signal further instructs setting of the second cell as the secondary cell, to set the second cell as the secondary cell in an activated state.
2. The mobile station according to claim 1, wherein
the first cell is a cell under control of a first radio base station,
the third cell is a cell under control of a second radio base station, and
the second cell is a cell under control of the first radio base station and is also a cell under control of the second radio base station.
3. A mobile communication method comprising the steps of:
receiving, by a mobile station which performs CA (Carrier Aggregation) communication by using a first cell under control of a first radio base station as a primary cell and using a second cell under control of the first radio base station as a secondary cell, a handover instruction signal instructing switching of the primary cell to a third cell under control of a second radio base station;
setting, by the mobile station, the second cell as the secondary cell in an activated state when the handover instruction signal further instructs setting of the second cell as the secondary cell;
forwarding, by the first radio base station, downlink data addressed to the mobile station from the first radio base station to the second radio base station;

transmitting, by the first radio base station, a forwarding completion notification signal to the second radio base station when forwarding of the downlink data addressed to the mobile station is completed; and instructing, by the second radio base station, the mobile station to delete the second cell set as the secondary cell when the second radio base station receives the forwarding completion notification signal.

\* \* \* \* \*